July 10, 1956 W. H. T. HELMIG ET AL 2,754,054

DEVICES FOR DETERMINING CHECK SYMBOLS FOR SYMBOL GROUPS

Filed March 6, 1951

5 Sheets-Sheet 1

Inventors
Theodorus Reumerman
Willem H. Th. Helmig
By Robert E. Burns
Attorney

Inventors
Theodorus Reumerman
Willem H. Th. Helmig
By Robert E. Burns
Attorney

July 10, 1956 W. H. T. HELMIG ET AL 2,754,054

DEVICES FOR DETERMINING CHECK SYMBOLS FOR SYMBOL GROUPS

Filed March 6, 1951

5 Sheets-Sheet 3

Inventors
Willem H. Th. Helmig
Theodorus Reumerman
By Robert E. Burns
Attorney

Inventors
Willem H. Th. Helmig
Theodorus Reumerman
By Robert E. Burns
Attorney

Inventors
Theodorus Reumerman
Willem H.Th. Helmig
By Robert E. Burns
Attorney 2,754,054
Patented July 10, 1956

2,754,054

DEVICES FOR DETERMINING CHECK SYMBOLS FOR SYMBOL GROUPS

Willem H. T. Helmig, Leiden, and Theodorus Reumerman, Zandvoort, Netherlands

Application March 6, 1951, Serial No. 214,178

Claims priority, application Netherlands March 10, 1950

10 Claims. (Cl. 235—61)

Figure 1:
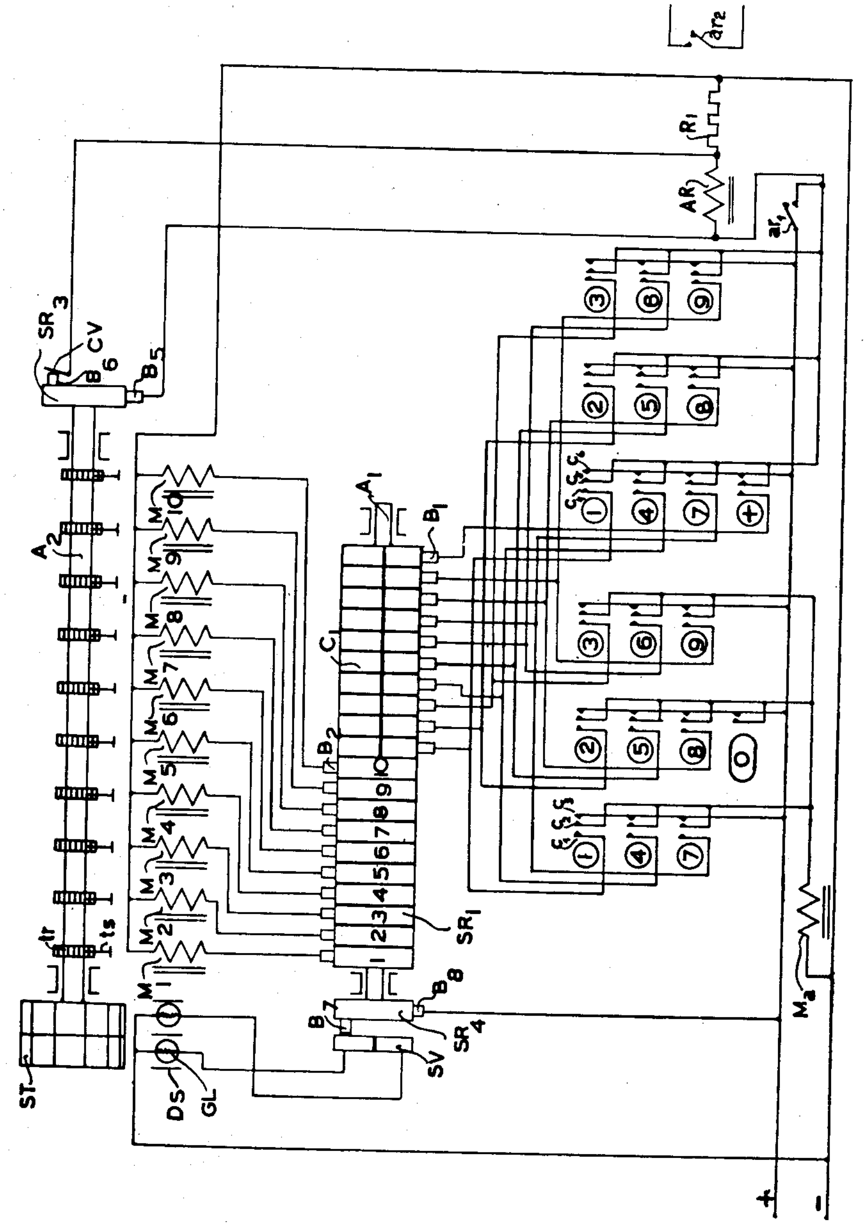

The invention relates to a device for facilitating the detection of errors in arbitrary symbol groups composed out of a given series of $n$ symbols. In this connection, the term "symbols" designates symbols of any kind which may be used for indicating or recording a concept, such as, for instance, letters, figures, punctuation marks, and the like.

In order to express certain concepts by means of symbols, the same are combined into symbol groups. The term "symbol groups" designates, for instance: words, numbers, sequences of a plurality of words or numbers, and sentences consisting of words, punctuation marks, and numbers.

In general, the number of symbols from which a selection may be made in composing a symbol group is determined by an agreement, or by the nature of the apparatus used for recording or transmitting the symbol group. For instance, in the transmission of code messages by means of a letter code, there exists an agreement to the effect that no other symbols shall be used than the 26 letters of the alphabet. Hence, the code message consists of symbol groups which are each composed out of a given series of 26 symbols ($n$=26).

In machines for handling symbol groups which are operated by means of a keyboard or a similar operating mechanism, such as, for instance, typewriters, composing machines, teleprinters, punching machines for preparing record cards for administrative and statistical purposes, cash registers, and various kinds of calculating and book-keeping machines, symbol groups can only be composed out of those symbols which can be selected by means of the keyboard. Hence, the number $n$ is equal to the number of different symbols indicated on the keys.

In various devices for indicating, recording and transmitting numbers, such as, for instance, measuring devices, counters, numbering devices, apparatus for automatic telephony, and the like, groups are composed out of a given series of 10 symbols ($n$=10).

In practice, frequent errors appear to occur in symbol groups of all kinds. These errors are partly brought about by a faulty operation of devices by means of which the symbol groups are recorded or transmitted, and partly by mistakes of persons working the said devices, or copying the symbol groups. The most frequently occurring error consists therein that a wrong symbol appears in one position of a symbol group; this error will be designated hereinafter by the term "one symbol error." Another error which occurs rather frequently, mainly due to human mistakes, consists therein that two adjacent symbols of a group have changed places with each other; this error will be designated hereinafter by the term "transposition error."

In general, the detection of errors in symbol groups involves a laborious checking process and in many cases, the errors which have been made are only brought to light by accident, or they are not detected at all.

However, the detection of errors in symbol groups may be considerably facilitated by making use of a device comprising means for determining a check symbol for each symbol group, said check symbol giving a univocal indication of the remainder $R_N(G)$ obtained on dividing a number G by a whole number N, the symbols of the given series being numbered in a predetermined manner, the said number G being equal to the algebraic sum of the numbers of the symbols of the group, each multiplied by a whole factor $k_i$, the said factors $k_i$ being dependent on the position of the symbol in the group and different for adjacent positions, and the said number N being greater than or equal to $n$ and having no divisors in common with the factors $k_i$ and with the differences between the factors $k_i$ for adjacent positions.

As appears from the above, a number of the symbols of the given series must precede the construction of such a device. In the device, this numbering finds expression in the order in which the symbols are placed, or in which means for handling the symbols are arranged. In general, if the given symbol series consists of the figures from 0 to 9, it will be preferable for practical reasons to number the symbols according to the numerical value of the figures, so that the numbers from 0 to 9 are ascribed to the figures from 0 to 9. If the given symbol series consists of the letters of the alphabet, it is advisable to number these letters in their usual order, for instance: $A=0, B=1, C=2$, etc.

By means of the above-mentioned device, a check symbol may be determined for a given symbol group which indicates the remainder $R_N(G)$ obtained on dividing a number G, designated hereinafter by the term "check number," by a given whole number N. As this remainder may assume N different values, N symbols are required to indicate the remainder in a univocal manner; hence, the check symbols are to be selected from a series of N symbols.

The above-mentioned check number G is equal to the algebraic sum of the numbers of the symbols of the group, each multiplied by a whole factor $k_i$ dependent on the position of the symbol in the group. Hereinafter, the position of a symbol in a group will always be determined by counting the positions from right to left. If the symbol appearing in position $i$ of the group is called $A_i$, and the number of this symbol $a_i$, and if the multiplication factor $k_i$ prevails for position $i$, the check number G of the group $A_qA_{q-1} \ldots A_3A_2A_1$ is equal to $\Sigma k_ia_i$.

The factors $k_i$ and the number N are chosen in such manner that a one symbol error, as well as a transposition of two adjacent symbols of the group, will always lead to an alteration of the check symbol pertaining to the group, so that the said errors may be detected at any time by determining the check symbol again, and by comparing the same with the check symbol which has been initially determined. The conditions to be satisfied to this end by the number N and the factors $k_i$ will now be explained.

In the case of a one symbol error, the symbol $A_i$ initially appearing in position $i$ of the symbol group has been replaced by another symbol $A_x$ which may be assumed to have the number $a_x$. Hence, the check number G of the group has been increased by an amount $k_i(a_x-a_i)$, and the check symbol of the group will have been altered by the error if $R_N[k_i(a_x-a_i)] \neq 0$. First of all, the numbers $k_i$ and $(a_x-a_i)$ must be indivisible by N to this end. The absolute value of the difference $(a_x-a_i)$ may vary from 1 to $(n-1)$; hence if N is selected to be greater than or equal to $n$, it is certain that $(a_x-a_i)$ will be indivisible by N. If, furthermore, all the factors $k_i$ are chosen in such manner as to be indivisible by N, the above-mentioned condition is satisfied. However, there is still a possibility that N is equal to the product of two numbers $p$ and $q$, $k_i$ being divisible by $p$ and $(a_x-a_i)$ being divisible by $q$. In this case, the product $k_i(a_x-a_i)$ would be divisible by N, so that $R_N(G)$ would not have been altered by the error. In order to exclude this possibility, care has to be taken that N has no divisors in common with the factors $k_i$. If the concept "divisor of a number" is defined in such manner as to include the number itself (so that, for instance, the divisors of the number 45 would be the numbers 3, 5, 9, 15, and 45), this condition includes the above-mentioned condition that the factors $k_i$ must be indivisible by N; hereinafter, the term "divisor" will always be used in this sense.

In the case of a transposition error, the symbols $A_i$ and $A_j$ initially appearing in positions $i$ and $j$ of the group, have changed places with each other. Hence the check number of the group has been increased by an amount $k_i(a_j-a_i)+k_j(a_i-a_j)=(k_i-k_j).(a_j-a_i)$, and the check symbol of the group will have been altered by the error if $R_N[(k_i-k_j)(a_j-a_i)]\neq 0$. To this end, the factors $k_i$ and $k_j$ must be different, and furthermore, it may be inferred by means of the train of thought followed hereinbefore that N may not have any divisors in common with the difference $(k_i-k_j)$. Hence, if a transposition of two adjacent symbols is required to lead to an alteration of the check symbol in all cases, the factors $k_i$ for adjacent positions must be different, and N may not have any divisors in common with the differences between factors $k_i$ for adjacent positions. If it is desired that each transposition of two arbitrary symbols of the group shall lead to an alteration of the check symbol, the more stringent requirement must be made that all factors $k_i$ are different and that N has no divisors in common with any difference between two factors $k_i$. In general, however, this latter requirement is not necessary, since transposition of adjacent symbols are by far the most frequent.

As appears from the above explanation, the device will have to satisfy the conditions that the factors $k_i$ are different at least for adjacent positions in the symbol group, and that N is greater than or equal to $n$, and has no divisors in common with the factors $k_i$ and with the differences between the factors $k_i$ for adjacent positions.

According to the said conditions, N must be an odd number. For if N would be even, all factors $k_i$ should be odd, as otherwise they would have the divisor 2 in common with N. However, in this case, the differences between the factors $k_i$ for adjacent positions would all be even, so that they would have the divisor 2 in common with N. Hence, the said conditions cannot be satisfied if N is even.

It will be clear that the greatest liberty in selecting the factors $k_i$, and the greatest certainty in detecting arbitrary transpositions may be obtained by selecting a prime number for N. In many cases, however, the same agreements will prevail, or the same apparatus will have to be used for recording or transmitting the check symbol as for composing the symbol groups, so that it is unavoidable to select the check symbols from the given series of $n$ symbols. As N different check symbols are required, N must be made equal to $n$ in these cases, or equal to $(n+1)$ if $n$ is even. If $N=n+1$, an open space (omission of the check symbol) may be used as an additional check symbol.

For instance, if the symbol groups are composed out of the figures from 0 to 9, and the same figures are also to be used as check symbols, there is no other choice than to make $N=11$. On the other hand, if other symbols, such as the letters of the alphabet, may be used as check symbols, N may also have another value, for instance, 13, 17, 19, or 23.

If the symbols of the given series, out of which the symbol groups are composed, also serve as check symbols, it will generally be preferable for practical reasons to make the remainder $R_N(G)$ indicated by a given symbol equal to the number ascribed to the symbol in question. For instance, if the symbol groups are composed out of the figures from 0 to 9, which have been numbered according to their numerical value, it will generally be preferable to indicate the remainder 0 by the symbol 0, the remainder 1 by the symbol 1, etc., the open space (omission of the check symbol) serving to indicate the remainder 10.

In the case of symbol groups composed out of the figures from 0 to 9, i. e. of ordinary numbers, it is often suitable to choose the factors $k_i$ in such manner that $k_i=R_N(10^{i-1})$, or $k_1=1$, $k_2=10$, $k_3=R_N(100)$, $k_4=R_N(1000)$, etc. By this measure, the remainder $R_N(G)$ indicated by the check symbol is made equal to the remainder obtained on dividing the symbol group itself by N, so that the check symbol pertaining to a given number may be found by dividing the number itself by N, and indicating the remainder obtained in this division by the symbol agreed on. If $N=11$, it will be necessary for this purpose to make $k_1=k_3=k_5= \ldots =1$, and $k_2=k_4=k_6= \ldots =10$, or (which amounts to the same thing): $k_1=k_3=k_5= \ldots =1$, and $k_2=k_4=k_6= \ldots =-1$. For $N=13$, one finds: $k_1=1$, $k_2=10$, $k_3=9$, $k_4=12$, $k_5=3$, $k_6=4$, $k_7=1$, $k_8=10$, etc.

Of course, in order that the correctness of a symbol group may be checked by means of the device according to the invention, the right check symbol must be known. Hence, the check symbol must be appended to the symbol group as soon as it has been determined for the first time, for instance by inserting the check symbol in the symbol group in a predetermined position, or by combining the check symbols of a sequence of symbol groups into a check group appended to said sequence. If care has been taken in this manner that the check symbol always accompanies the symbol group, the correctness of the symbol group may be checked at any time.

Preferably, the initial determination of the check symbol is performed during or immediately after the formation of the symbol group, so that a check is possible during the whole period of existence of the symbol group.

By thus providing each symbol group at birth with a check symbol which always accompanies the symbol group, a closed checking system is obtained, wherein every error made by man or machine may be detected, and wherein the occurrence of errors may even be completely prevented, if the checking is performed automatically by all machines that are used. The laborious checking jobs required up to now in many administrations may be reduced to a minimum by these means.

It is the object of the present invention to provide a device of the above-mentioned kind which is easy to operate, and which may be readily incorporated in any kind of business machine in order to check any symbol groups inserted therein together with an accompanying check symbol.

According to the invention, the selector of the device is formed as a key board wherein each key upon being depressed actuates a switch so as to close an electric circuit comprising means for displacing the indicator over a number of steps proportional to the number of the symbol selected by the key in question, and dependent on the position of the selected symbol in the symbol group.

Thus, the device according to the invention is provided with a key board, by means of which the symbols of the group to be checked may be selected, and with an indicator showing the check symbol pertaining to the selected group. The indicator may consist of a displaceable indicating member, such as a pointer or a window, which is moved along a fixed N-partite scale on which the check symbols are arranged in an order determined by the further construction of the device, or of a displaceable scale constructed in the above-described manner which is moved along a fixed indicating member. Upon each selection of a symbol, the indicator is displaced over a distance which is proportional to the number of the selected symbol, and which is further determined by the position of the symbol in the symbol group. If the said distances have been rightly chosen, the indicator will show the appertaining check symbol after selection of the complete symbol group. If, in order to obtain an automatic checking, the device according to the invention is incorporated in another apparatus, for instance in a calculating or book-keeping machine, it will generally be preferable to use the key board of this apparatus simultaneously as a selector for the device according to the invention.

As stated hereinbefore, the displacement of the indicator caused by the selector upon selection of a symbol must be dependent on the position of the symbol in the symbol group. Hence, the position of the symbol in the symbol group must be recorded in some manner. This requirement is always satisfied if a so-called full key board is used as a selector, which is often used in cash registers and in calculating and book-keeping machines, and which comprises a separate key group for each position in the symbol group to be selected. In this case, a different transmission may be provided between each key group and the indicator, having a transmission ratio corresponding with the factor $k_i$ prevailing for the position in question, so that upon selection of a symbol group, the indicator is displaced over a number of steps corresponding with the check number of the symbol group so as to show the right check symbol. In general, a full key board is constructed in such manner that the first symbol from the right in each symbol group is bound to a fixed position so as to be always selected by means of one and the same key group. Hence, in such a device the positions which a symbol may occupy in a symbol group are automatically numbered from right to left. Of course, a full key board is rather expensive, so that it can only be considered as a selector for the device according to the invention if the number of symbols of the given series is not too large (for instance if $n=10$), or if the device according to the invention is incorporated in an apparatus provided with a full key board.

In other cases, for instance if the device according to the invention is constructed as a separate apparatus, and if the number of symbols in the given series is relatively large, it will generally be preferable to use a key board with only one group of keys. Moreover, the use of such a singular key board will generally be necessary if the device according to the invention is incorporated in an apparatus provided with a singular key board, which is the case, for instance, with typewriters, composing and punching machines, teleprinters, and some kinds of calculating and bookkeeping machines. If a singular key board is used, the symbols of a symbol group to be checked are all selected by the same means, so that the position of a symbol can only be expressed by the order in which the symbols are selected. The device may now be provided with a switching mechanism which introduces a different transmission after each selection of a symbol, in such manner that the displacement of the indicator is always in accordance with the factor $k_i$ prevailing for the position in question. As the positions to be occupied by a symbol in the symbol group have been numbered from right to left, the symbols of the symbol group to be checked will have to be selected from right to left in this case; this is rather a difficult procedure, as the symbol groups are generally read from left to right. Only if all symbol groups to be checked would consist of the same number of symbols, so that the position of the first symbol from the left would always be known with certainty, the device could be carried out in such manner that the symbols could be selected from left to right.

Of course, the above-mentioned difficulty could be avoided by departing from the existing agreement, and numbering the positions to be occupied by a symbol in the symbol group from left to right. However, this procedure would present the disadvantage that the check symbols determined by means of such a device would no longer correspond with the check symbols found by means of a device with a full key board. Besides, the agreement which has been made with respect to the indication of the positions in the symbol group has various practical advantages, in particular when the symbol groups to be checked are numbers. For instance, if the positions in the symbol group have been numbered from right to left, noughts placed before a number may be left out of consideration in determining the check symbol, provided that the number 0 has been ascribed to the figure 0.

Thus, the problem arises whether a device with a singular key board could be constructed in such manner that the right check symbol is found by selecting the symbols of the symbol group to be checked from left to right, while retaining the agreement made with respect to the numbering of the positions in the symbol group. This problem may be analysed as follows.

It is assumed that the device is provided with a switching mechanism, which introduces a different transmission after each selection of a symbol, and that the transmission ratios have been chosen in such manner that the indicator is displaced over $m_1a_q$ steps upon selection of the first symbol from the left $A_q$, over $m_2a_{q-1}$ steps upon selection of the second symbol from the left $A_{q-1}$, and so on. In this connection, a step of the indicator designates a displacement wherein the indicating member and the scale are displaced with respect to each other over a distance equal to one Nth of the scale, i. e. to the distance between two adjacent symbols on the scale.

After selection of the entire symbol group, the indicator occupies a position which is $t$ steps away from the zero position wherein $$t=R_N(m_1a_q+m_2a_{q-1}+m_3a_{q-2}+\ldots+m_{q-1}a_2+m_qa_1)$$

The remainder $R_N(G)$ indicated by the check symbol pertaining to the symbol group is equal to $$r_c=R_N(k_qa_q+k_{q-1}a_{q-1}+\ldots+k_2a_2+k_1a_1)$$

If the graduation of the scale has been suitably chosen, the right check symbol will now be displayed by the indicator if $r_c$ is always proportional to $t$. If $r_c$ is supposed to be equal to $s_qt$, the said condition can only be satisfied for any values of the symbol numbers $a_i$ by making $m_1s_q=k_q$, $m_2s_q=k_{q-1}$, $m_3s_q=k_{q-2}$, and so on.

First of all, it will be necessary for this purpose that $m_1/m_2=k_q/k_{q-1}$, $m_2/m_3=k_{q-1}/k_{q-2}$, etc., and this independently of the number of symbols of the symbol group, i. e. for any value of $q$. Hence, the general rule will be: $m_1/m_2=\ldots=k_i/k_{i-1}$. This means that the factors $k_i$ will have to form a geometrical progression, so that $k_i=k_1.w^{i-1}$, and that the transmission ratios $m_j$ will likewise have to form a geometrical progression, but in such manner that $m_j=m_1/w^{j-1}$. Thus, the transmission ratio will have to be reduced $w$ times after each selection of a symbol.

Furthermore, it will be necessary that $$s_q=k_q/m_1=w^{q-1}.k_1/m_1$$

and this for any value of $q$, so that the general rule will be: $s_j=w^{j-1}.k_1/m_1$. Hence, the switching mechanism will have to put a different scale into operation after each selection of a symbol, on which the distance between two check symbols indicating consecutive values of the remainder $R_N(G)$ is $w$ times as large as on the preceding scale. On the first scale, this distance is equal to $k_1/m_1$ steps.

If a device according to the invention has been constructed in such manner that the switching mechanism, after each selection of a symbol, introduces a transmission which is $w$ times smaller than the preceding one, and puts a scale into operation on which the distance between two check symbols indicating consecutive values of the remainder $R_N(G)$ is $w$ times as large as on the preceding one, the values of the various factors $k_i$ are fully determined thereby, since for such a device the relation $$s_j m_j = \text{constant} = k_1$$

prevails, as explained hereinbefore, whereas the other factors $k_i$ follow from the relation $k_i=k_1.w^{i-1}$. Hence, it appears that the position of the switching mechanism at the moment at which the selection begins is fully indifferent, so that the switching mechanism need never be returned to a definite zero position.

On the other hand, the indicator will have to be returned to its zero position after the check symbol of a symbol group has been determined. Preferably, this return movement of the indicator is effected by selecting the check symbol, either by means of the same selector which has been used for the selection of the symbol group, or by means of a special check selector. At the same time, this procedure provides the possibility to check the correctness of a symbol group automatically, to wit by means of an alarm device which is operated if the indicator does not return to its zero position after selection of the check symbol accompanying the symbol group.

If it is desired to return the indicator to its zero position by selecting the check symbol by means of the same selector which has been used for selecting the symbol group, the device must satisfy certain requirements. Suppose that the switching mechanism occupies its position $j$ after selection of the symbol group, and that the indicator displays the check symbol $A_c$ indicating the remainder $r_c$. As set forth hereinbefore, the indicator now occupies a position which is $r_c/s_j$ steps away from the zero position. Upon selection of the symbol $A_c$, the indicator makes $m_{j+1}a_c$ steps. Hence, the indicator will be returned to its zero position if $$m_{j+1}a_c = -r_c/s_j$$

or $$a_c = -wr_c/k_1$$

If a separate check selector is used for returning the indicator to its zero position by selection of the check symbol, the symbol indicating the remainder $r_c$ may be chosen at random. However, the check selector must satisfy the condition that the indicator makes $-r_c/s_j$ steps upon selection of the check symbol indicating the remainder $r_c$. Hence, the switching mechanism must also introduce a different transmission between the check selector and the indicator after each selection of a symbol. If these are other transmissions than used for the coupling of the main selector with the indicator, the transmission ratios may always be chosen in such manner as to satisfy the above condition. On the other hand, if the same transmissions are used for coupling both selectors with the indicator, care must be taken that the selection of the check symbol indicating the remainder $r_c$ has the same effect as the selection of the symbol having the number $-wr_c/k_1$ by means of the main selector. For instance, if both selectors are key groups operating electric contacts, the contact of the check key carrying the check symbol by which the remainder $r_c$ is indicated must be shunted to the contact of the key of the main selector which carries the symbol having the number $-wr_c/k_1$. These conditions will be more fully explained hereinafter with reference to examples.

It is to be noted that the remainder $R_N(G)$ does not change if one of the factors $k_i$ is increased by an amount $bN$, wherein $b$ is a whole number which may either be positive, negative or zero. Also, the final position of the indicator is not altered if one of the transmission ratios $m_j$ is increased by an amount $bN$. Finally, the check symbol displayed by the indicator remains the same if the scale pitch $s_j$, i. e. the distance on the scale between two check symbols indicating consecutive values of the remainder $R_N(G)$ is increased by an amount $bN$. Hence, if the above-mentioned geometrical progressions yield two different values for the factors $k_i$, $m_j$ or $s_j$ having a difference which is divisible by N, it is useless to employ both these factors. It will suffice to retain only the smallest value. If these considerations are taken into account, the above-mentioned relations are modified as follows:

$$k_i=R_N(k_1.w^{i-1});\ m_j=(m_1+bN)/w^{j-1};\ s_j=R_N(s_1.w^{j-1});$$
$$s_1=(k_1+bN)/m_1;\ a_c=(-wr_c+bN)/k_1$$

For instance, if $N=11$, $k_1=1$, and $w=10$, the following series is found for the factors $k_i$ in the first instance: 1–10–100–1000–. . . . By substitution of the remainder obtained on division by 11 for each term of this series, it changes into: 1–10–1– etc., or (which amounts to the same thing) to: 1–(–1)–1, etc. The same series may be used for the transmission ratios and for the scale pitches. In order that the indicator may be returned to its zero position by selecting the check symbol, $a_c$ must be equal to $r_c$.

If $N=13$, $k_1=1$, and $w=10$, the series 1–10–100–1000–10000–. . . is found in the first instance for the factors $k_i$. By substitution of the remainder obtained on division by 13 for each term of this series, it changes into: 1–10–9–12–3–4–1, so that a series of six different factors is found. For the transmission ratios, the same series may be used in opposite order, i. e. 1–4–3–12–9–10–1, whereas the series for the scale pitches will have to correspond with the above series for the factors $k_i$. In order that the indicator may be returned to its zero position by selecting the check symbol, $a_c$ must be equal to $3r_c$ in this case.

The exact nature of the present invention, and the manner in which the same is to be performed, will now be more fully explained with reference to the accompanying drawings, showing some embodiments of the invention.

Figure 3:
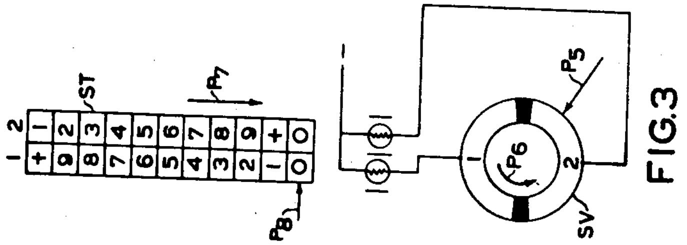
Figure 2:
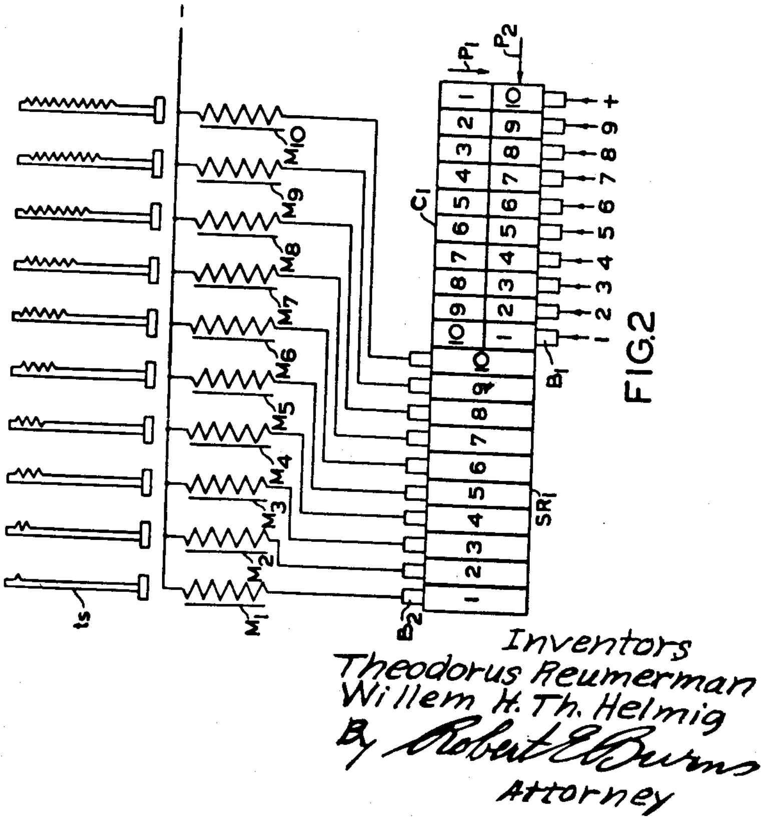

Fig. 1 is a circuit diagram of a device according to the invention, in which the symbols of a symbol group are selected one after another by means of one and the same group of keys. In this device, the number N is equal to 11. Figs. 2 and 3 show details of the device shown in Fig. 1.

Figure 4:
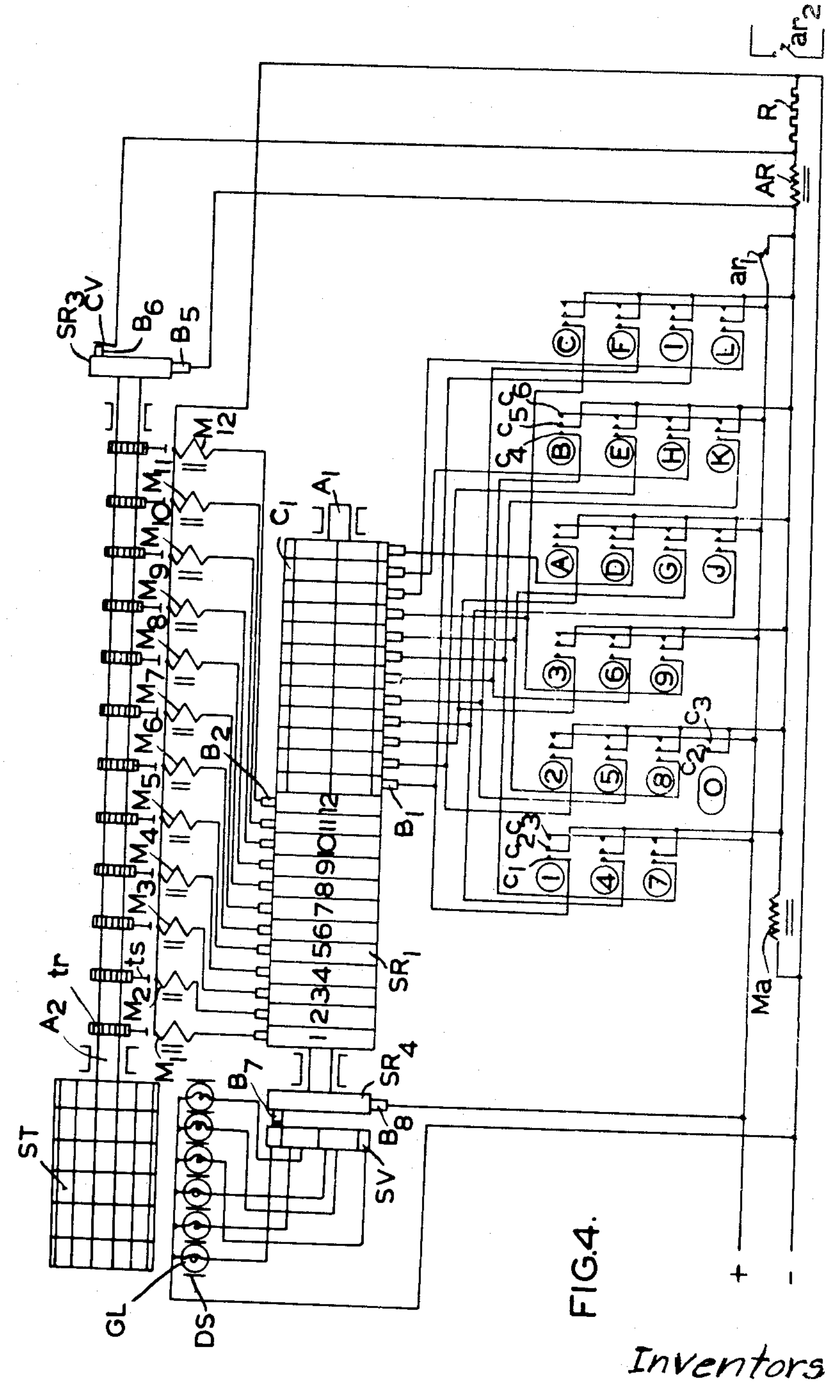
Figure 6:
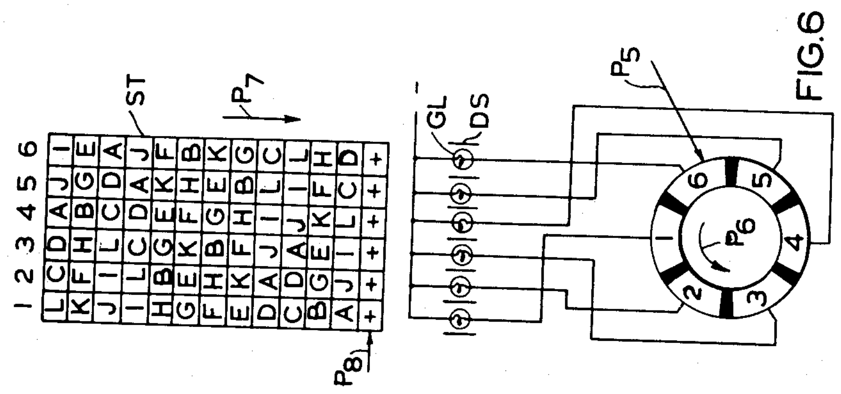
Figure 5:
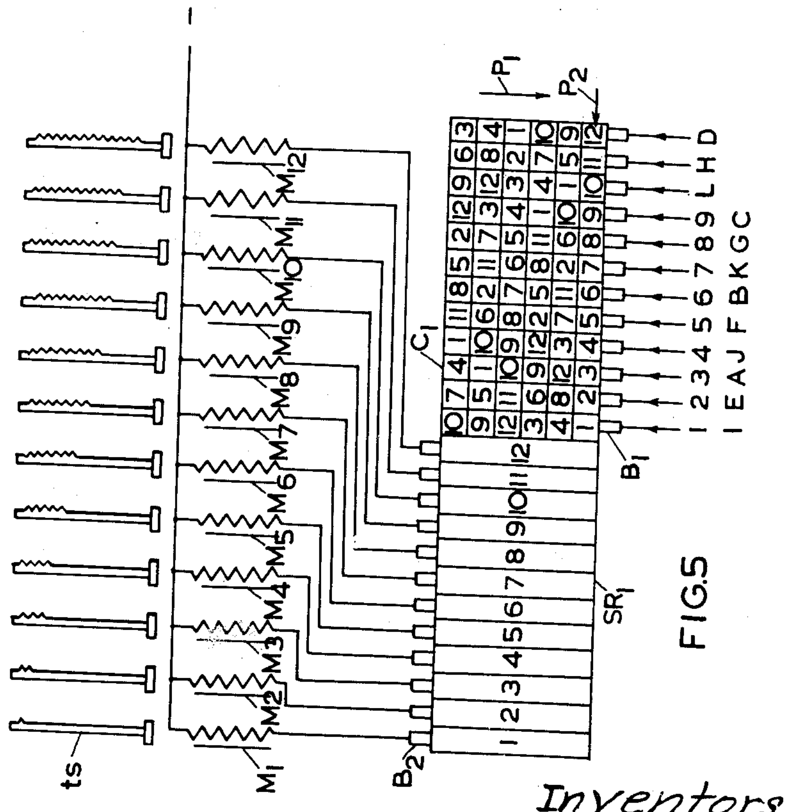
Figures 7, 8:
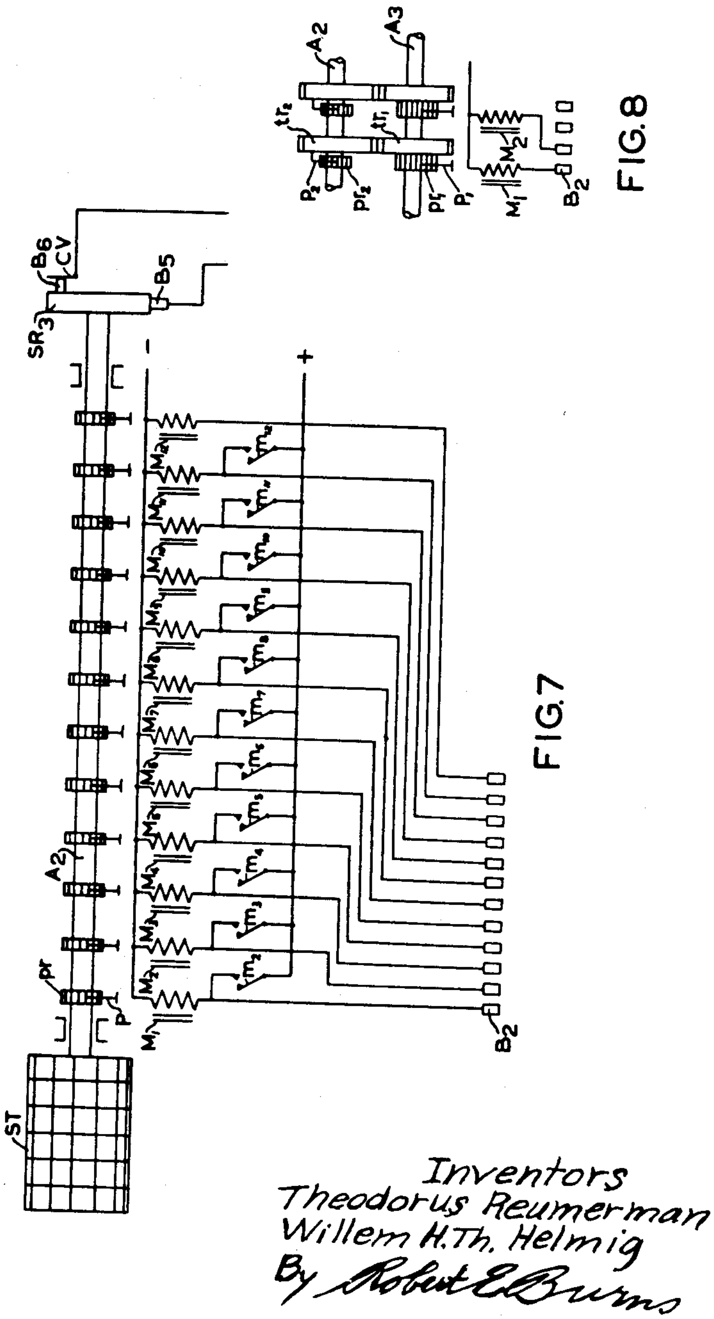

Fig. 4 is a circuit diagram of a device substantially corresponding with the device shown in Fig. 1, in which the number N is equal to 13, however. Figs. 5 and 6 show details of the device shown in Fig. 4, and Figs. 7 and 8 show two modifications of this device.

Figs. 1–3 relate to a device actuated by means of a singular key board, wherein the factor $k_i$ is equal to 1 for all odd positions and to –1 for all even positions, and wherein the number N is equal to 11. The device satisfies the condition that the symbols of a symbol group to be checked may be selected from left to right. As explained hereinbefore, a different transmission must be introduced for this purpose after each actuation of a key, the transmission ratios being alternately equal to 1 and to –1. At the same time, a different scale must be made operative after each actuation of a key, two scales being provided, on which the check symbols are arranged in opposite order. The switching mechanism serving to change over the transmission and the scale is controlled by a shaft $A_1$ which is displaced over one position after each actuation of a key.

The circuit diagram of Fig. 1 shows at the left ten keys bearing the figures from 0 to 9, by means of which a number to be checked may be selected, and at the right ten keys bearing the figures from 1 to 9 and $a$+ for selecting the check symbol. The first-mentioned keys serve at the same time as actuating members of a machine in which the device is incorporated. Each of these keys cooperates with two movable contacts $c_1$ and $c_2$, engaging a fixed contact $c_3$ upon depression of a key. However, the key bearing the figure 0 has only been provided with a movable contact $c_2$ and a fixed contact $c_3$. The fixed contacts $c_3$ are all connected with the positive terminal of a direct current source, and the movable contacts $c_2$ are all connected with the negative terminal of this current source through the excitation coil of a magnet $M_a$. Thus, the magnet $M_a$ is always energized upon depression of any of the keys of the left key group. This magnet operates in known manner as a step magnet for driving the shaft $A_1$, so that this shaft is always rotated over half its circumference upon release of a key. If necessary, a gearing may be inserted between the step magnet and the shaft $A_1$ for this purpose. The movable contacts $c_1$ are each connected with one of a plurality of brushes $B_1$ engaging the surface of a commutator $C_1$ mounted on the shaft $A_1$. Hence, upon depression of one of the keys bearing the figures from 1 to 9 of the left key group, a positive voltage is always applied to one of the brushes $B_1$.

Each of the checking keys shown at the right in the drawing co-operates with two movable contacts $c_4$ and $c_5$, which engage a fixed contact $c_6$ upon depression of a key. The fixed contacts $c_6$ are all connected with the positive terminal of the current source, whereas the movable contacts $c_5$ are all connected with the negative terminal through the excitation coil of an alarm relay AR and a resistance $R_1$. Thus, the alarm relay is always energized upon depression of any of the checking keys, so as to close its contacts $ar_1$ and $ar_2$. Through contact $ar_1$, the relay is kept energized after release of the key, whereas contact $ar_2$ closes an alarm circuit, whereby a warning signal is produced. If desired, contact $ar_2$ may also be formed as a break contact, so as to interrupt the supply of energy to a machine co-operating with the device upon excitation of the alarm relay. If after selection of a number the right check symbol appertaining to the number is selected, the relay AR is short-circuited, as will be explained hereinafter, so that the relay is de-energized and the alarm is cancelled. The movable contacts $c_4$ are each connected with the corresponding brush $B_1$, so that a positive voltage is applied to the associated brush $B_1$ upon depression of one of the checking keys.

The segments of the commutator $C_1$ are connected, in an order to be described hereinafter, with slip rings $SR_1$, marked in the drawing with the numbers from 1 to 10 and likewise mounted on the shaft $A_1$, so as to engage the brushes $B_2$. The brushes $B_2$ are each connected with the negative terminal of the current source through an associated magnet $M_1$–$M_{10}$. If one of the keys bearing the figures from 1 to 9, or the checking key bearing the plus sign is depressed, a circuit is completed for one of the magnets $M_1$–$M_{10}$ through the associated brush $B_1$, the segment of commutator $C_1$ opposite to this brush, the slip ring $SR_1$ connected with this segment, and the appertaining brush $B_2$, so that the magnet in question is energized. Magnets $M_1$–$M_{10}$ are each provided with an armature carrying a toothed wheel *tr* mounted on a shaft $A_2$. The toothed wheels *tr* are attached to the shaft $A_2$ in such manner that they take along the shaft $A_2$ when they are driven, whereas the shaft $A_2$ is freely rotatable when the toothed wheels are stopped. For this purpose, use is made of a coupling of the kind used in bicycles. As will be explained hereinafter, the toothed racks *ts* are formed in such manner that the shaft $A_2$ is displaced over one step upon excitation of magnet $M_1$, over two steps upon excitation of magnet $M_2$, over three steps upon excitation of magnet $M_3$, and so on. Hence, upon depression of a key the shaft $A_2$ will always be displaced over a number of steps determined by the live slip ring $SR_1$.

The right end of shaft $A_2$ carries a slip ring $SR_3$ engaging a brush $B_5$. One of the side faces of slip ring $SR_3$ carries a brush $B_6$, which engages a contact blade CV in the zero position of shaft $A_2$. In this zero position, the excitation coil of the alarm relay AR is short-circuited through brushes $B_5$ and $B_6$ and contact blade CV, so that no alarm can occur. Hence, it will be understood that the alarm is prevented if the checking key struck after selection of a number by means of the left key group is so chosen as to bring the shaft $A_2$ in its zero position. If another checking key is struck, alarm is given.

At its left end, the shaft $A_2$ carries a scale drum ST made of a translucent material and bearing two juxtaposed eleven-partite scales, each containing the check symbols, i. e. the figures from 0 to 9 and a plus sign, in an order to be described hereinafter. At the inside of the drum ST, two glow lamps GL are provided, which are screened with respect to each other by means of partitions DS, so that each lamp lights only one of the scales. Although the glow lamps GL are actually placed inside the drum ST, they are shown outside the drum in the drawing for the sake of clarity. The glow lamps GL are alternately switched on by means of a current distributor SV co-operating with the shaft $A_1$, so that only one of the two scales is lighted in each position of the shaft $A_1$. The scales are read by means of a window provided in the casing of the device, through which only one of the check symbols arranged on the scale is visible at any time.

The current distributor SV comprises two segments, insulated with respect to each other and scanned by a brush $B_7$, arranged on a side face of a slip ring $SR_4$, mounted on the shaft $A_1$. This slip ring is connected through a brush $B_8$ with the positive terminal of the current source, whereas the segments of the distributor SV are each connected with the negative terminal through one of the glow lamps GL.

As appears from the drawing, the brushes $B_1$ are connected in such manner with the movable contacts of the various keys that the first brush is connected with the contacts of the keys bearing the figure 1, the second brush with the contacts of the keys bearing the figure 2, and so on. The tenth brush is only connected with the movable contact $c_4$ of the checking key bearing the plus sign.

Fig. 2 shows a development of the commutator $C_1$ and the appertaining slip rings. As appears from the drawing, the commutator $C_1$ is divided in two banks of ten segments each. The numbers on the segments indicate the slip ring $SR_1$ connected with the segment in question. The segments of the lower bank bear the numbers from 1 to 10 in the usual order, whereas the segments of the second bank bear the same numbers in opposite order. The arrow $P_1$ indicates the direction wherein the commutator $C_1$ is moved along the brushes $B_1$, and the arrow $P_2$ indicates an arbitrary zero position of the commutator $C_1$ to be used hereinafter in explaining the operation of the device.

In this zero position, the brushes $B_1$ engage the lower bank of segments of the commutator $C_1$. At the various brushes $B_1$, the keys connected with these brushes have been indicated for the sake of clarity.

Furthermore, the construction of the toothed racks *ts* actuated by the magnets $M_1$–$M_{10}$ has been shown in Fig. 2. As appears from the drawing, the toothed rack of magnet $M_1$ has only one tooth, the toothed rack of magnet $M_2$ has two teeth, the toothed rack of magnet $M_3$ has three teeth, and so on. Upon excitation of one of the magnets, the appertaining toothed rack is moved along the associated toothed wheel at full length, so that the shaft $A_2$ is displaced over a number of steps corresponding with the number of teeth of the toothed rack in question.

Fig. 3 shows the scale drum ST and the current distributor SV in detail. The distributor SV is shown in side view, the segments being marked with the figures 1 and 2. In the zero position of the shaft $A_1$ which has been indicated by the arrow $P_2$ in Fig. 2, the brush $B_7$ (cf. Fig. 1) engages segment 2 of the distributor, as indicated schematically by the arrow $P_5$, so that the right-hand glow lamp GL is lighted. Arrow $P_6$ indicates the direction wherein the brush $B_7$ moves along the segments of the distributor.

Furthermore, Fig. 3 shows a development of the scale drum ST. The two scales are numbered with the numbers 1 and 2 so as to correspond with the numbering of the segments of the distributor. Hence scale 1 is lighted when brush $B_7$ engages segment 1 of the current distributor SV. Arrow $P_7$ indicates the direction in which the scales move along the reading window, and arrow $P_8$ indicates the zero position of the scale drum. In this zero position, the figures 0 of both scales appear before the window. Before use of the device, the scale drum must always be brought into the zero position, which may be done by actuating the checking key which bears the check symbol indicated by the scale.

As appears from the drawing, scale 1 contains the figures from 0 to 9 in their usual order, and a plus sign after the figure 9, whereas scale 2 contains first an 0 and a plus sign, and after that the figures from 9 to 1.

The operation of the device may be readily understood by selecting in thought a desired number, for instance the number 368, by means of keys of the left group. It will be assumed that shaft $A_1$ occupies the zero position indicated by the arrows $P_2$ and $P_3$. Of course, shaft $A_2$ must also occupy its zero position.

Upon actuating of key 3, magnet $M_3$ is energized through the third segment of the lower bank of commutator $C_1$ and through the third slip ring $SR_1$, so that shaft $A_2$ makes three steps. Upon releasing key 3, shaft $A_1$ is displaced over one position, so that scale 1 is lighted. On this scale, the figure 3 is read, which indicates the remainder obtained on division of the number 3 by 11. (If checking 3 is depressed after that, magnet $M_8$ is energized through the third segment of the second bank of commutator $C_1$ and the eighth slip ring $SR_1$, so that shaft $A_2$ makes eight steps and returns to its zero position.)

Upon actuation of key 6, magnet $M_5$ is energized through the sixth segment of the second bank of commutator $C_1$ and the fifth slip ring $SR_1$, so that shaft $A_2$ makes five steps and reaches position 8. Upon releasing key 6, scale 2 is lighted, and the figure 3 is read, which corresponds with the remainder obtained on dividing 36 by 11. (If checking key 3 is depressed after that, magnet $M_3$ is energized through the third segment of the first bank of commutator $C_1$ and the third slip ring $SR_1$, so that shaft $A_2$ makes three steps and returns to its zero position.)

Upon actuation of key 8, magnet $M_8$ is energized through the eighth segment of the first bank of commutator $C_1$ and the eighth slip ring $SR_1$, so that shaft $A_2$ makes eight steps and reaches position 5. Upon releasing key 8, shaft $A_1$ is displaced over one position so that scale 1 is lighted. This scale displays the figure 5, corresponding with the remainder obtained on dividing 368 by 11. Upon actuation of checking key 5, shaft $A_2$ returns to its zero position.

It is pointed out that upon actuation of key 0, shaft $A_2$ remainds in the same position, and only shaft $A_2$ is displaced so as to switch over to a different scale.

It will now be clear that the above-described device will serve to determine the check symbol of a given number, as well as to check a number already provided with a check symbol. For instance, if the number 368–5 is received, 5 being the check symbol, and a different number is selected, such as the number 386–5, shaft $A_2$ will not return to its zero position upon actuation of checking key 5, so that the alarm relay is not short-circuited, and alarm is made. The alarm may consist of an optical or acoustic signal, or of an interruption of the circuit of the machine in which the device is incorporated. Of course, alarm is also made upon selection of a number which has been mutilated in copying or transmitting beforehand.

If the contacts $c_1$, $c_2$, $c_4$ and $c_5$ are directly actuated by the keys of the device, the checking is restricted to the question whether the number has been rightly received and rightly selected by means of the key board. Instead of using this direct control of the said contacts by the keys, the operation of the machine may be included in the checking by using members actuated by the keys and lying at the output side of the machine for controlling the contacts. For instance, if the machine is constructed in such manner that a number selected by means of the keys is printed at the same time, the said contacts may be coupled with the members serving for printing the numbers. A faulty operation of the machine, in which the device has been incorporated, is also detected in that case.

Fig. 4 is a circuit diagram of a device according to the invention likewise actuated by means of a singular key board and substantially corresponding with the device shown in Figs. 1–3, the number N being equal to 13, however. The factors $k_i$ have been chosen in such manner that the remainder $R_N(G)$ indicates the remainder obtained on division by 13 of the number to be checked at the same time. As explained hereinbefore, the following factors $k_i$ are to be used for this purpose: $k_1=1$, $k_2=10$, $k_3=9$, $k_4=12$, $k_5=3$, $k_6=4$, $k_7=1$, and so on. Furthermore, the device has been constructed in such manner that the symbols of a symbol group to be checked may be selected from left to right, the following transmission ratios between the selector and the indicator being used for this purpose: $m_1=1$, $m_2=4$, $m_3=3$, $m_4=12$, $m_5=9$, $m_6=10$, $m_7=1$, and so on. Hence, a switching mechanism with six different positions will be required. The scale pitches of the scales successively brought into operation by the switching mechanism are found to be equal to the factors $k_i$. In order that the indicator may be returned to its zero position by selecting the check symbol by means of a checking key, the contacts of the checking key in question must be connected in parallel with the contacts of the key of the main selector bearing the symbol of which the number is equal to three times the remainder indicated by the check symbol.

The device again comprises ten keys marked with the figures from 0 to 9 and serving at the same time as actuating means of a machine in which the device is incorporated, the symbols of a symbol group to be checked being selected by means of these keys. At the right of these keys, twelve checking keys bearing the letters from A to L have been shown. The letter A is used for indicating the remainder 1, the letter B for indicating the remainder 2, and so on. A remainder 0 is indicated by an open space (omission of the check symbol).

The circuit arrangement of the contacts operated by both key groups is substantially the same as shown in Fig. 1; however, contact $c_4$ of key A is connected with contact $c_1$ of key 3, contact $c_4$ of key B with contact $c_1$ of key 6, and so on, in such manner that contact $c_4$ of each checking key is connected with contact $c_1$ of the key of the left key group bearing a number which is thrice the remainder indicated by the checking key in question.

Of course, the commutator $C_1$, the current distributor SV and the scale drum ST consist of six parts in the present circuit, and twelve slip rings $SR_1$ are provided.

In the circuit shown in Fig. 4, the means for driving the shaft $A_2$ are the same as the means provided for this purpose in the circuit shown in Fig. 1.

Fig. 5 shows a development of commutator $C_1$, and of the associated slip rings $SR_1$ and $SR_2$. As appears from the drawing, commutator $C_1$ is divided in six banks of twelve segments each. The numbers indicated on these segments are the numbers of the slip rings $SR_1$ connected with each segment. The segments of the lowermost bank bear the numbers from 1 to 12 in their usual order. The numbers in each successive bank are four times as much as in the preceding bank, multiples of 13 being subtracted from numbers greater than 13, however, in order to obtain numbers less than 13. For instance, according to the above-mentioned rule, the numbers on the segments of the second bank should have been: 4–8–12–16–16–20–24–28–32–36–40–44–48, from which the numbers 4–8–12–3–7–11–2–6–10–1–5–9 indicated in the drawing are obtained by subtracting the largest possible multiples of 13. With the aid of this example, it is easy to convince oneself that the numbers indicated on the remaining banks are also in accordance with the above-mentioned rule. By multiplying the numbers on the sixth bank by four and subtracting multiples of 13, the numbers from 1 to 12 in their natural order, as indicated on the first bank, are again obtained. This connection of the segments satisfies the condition for the transmission ratios $m_j$ which has been stipulated hereinbefore, as will be clear from an inspection of the numbers on the first segments of the various banks.

In Fig. 6, the scale drum ST and the current distributor SV are shown in detail. The segments of the distributor SV are marked with the figures from 1 to 6. In the zero position of shaft $A_1$ which has been indicated by the arrow $P_2$ in Fig. 5, brush $B_7$ (cf. Fig. 4) engages segment 6 of the distributor, so that the glow lamp GL at the extreme right is burning, as indicated by the arrow $P_5$. Arrow $P_6$ indicates the direction in which brush $B_6$ is moved along the segments of the distributor.

Fig. 6 shows a development of the scale drum ST. The scales have been numbered with the numbers from 1 to 6 in accordance with the numbering of the segments of distributor SV. Thus, when brush $B_7$ engages segment 1 of the distributor, scale 1 is lighted, and so on. In the zero position of shaft $A_2$, a row of plus signs faces the reading window of the scale drum ST.

Scale 1 contains the letters from A to L in their usual order. As already stated hereinbefore, letter A represents a remainder 1, letter B a remainder 2, and so on. The scales have been arranged in such manner that each scale contains letters corresponding with remainders that are ten times as much as on the preceding scale. Thus, the second scale contains letters corresponding with the remainders 10, 20, 30, etc. By subtraction of the greatest possible multiples of 13, these values change to the series 10, 7, 4, 1, 11, 8, 5, 2, 12, 9, 6, 3, corresponding with the series of letters J–G–D–A–K–H–E–B–L–I–F–C as shown in the drawing. By multiplying the numbers corresponding with the letters on scale 6 by 10, and subtracting the largest possible multiples of 13, the numbers from 1 to 12 are found. On inspection of the letters facing the reading window in position 1 of shaft $A_2$ (A–J–I–L–C–D), it is immediately apparent that these letters correspond with the factors $k_1$.

The operation of the above-described device may be understood in a simple manner by selecting in thought a number, for instance the number 3683507, by means of the left key group. Starting from the zero position of shaft $A_1$ as indicated by the arrows $P_2$ and $P_5$, selection of keys 3, 6, 8, 3, 5, 0, and 7 successively brings shaft $A_2$ into positions 3, 1, 12, 9, 2, 2, and 9, in which the scales 1, 2, 3, 4, 5, 6 and 1, respectively, display the letters C, J, D, D, F, H and I corresponding with the remainders obtained on division of the numbers 3, 36, 368, 3683, 36835, 368350 and 3683507. Also, it will be understood that shaft $A_2$ may be returned to its zero position in any phase of the procedure by selecting the last check symbol to be displayed with the aid of the right key group. Upon starting from a different zero position of shaft $A_1$, the same check symbols are found in different positions of shaft $A_2$.

In the modification shown in Fig. 7, the shaft $A_2$ is driven by a series of step magnets $M_1$—$M_{12}$ each adapted to displace shaft $A_2$ by means of a pawl $p$ and a ratchet wheel $pr$ schematically shown in the drawing. In contradistinction to the above-mentioned step magnets $M_a$ and $M_b$, the step magnets $M_1$—$M_{12}$ are constructed in such manner as to displace shaft $A_2$ over 1/13 of its circumference when one of the magnets is energized, whereas no displacement occurs when the magnet is de-energized. When shaft $A_2$ is rotated by one of the magnets, the ratchet wheels of the other magnets move freely over the appertaining pawls.

As appears from the drawing, the excitation coils of magnets $M_1$—$M_{12}$ are each connected between one of the brushes $B_2$ and the negative terminal of the current source. Thus, if a voltage is supplied to the eighth slip ring $SR_1$, for instance, by depression of a key, magnet $M_8$ is energized. Magnets $M_2$—$M_{12}$ are each provided with a make contact $m_2$—$m_{12}$, which upon excitation of the magnet supplies a positive voltage to the excitation coil of the preceding magnet, so that the latter is also energized. Hence, when magnet $M_8$ is energized, magnets $M_1$—$M_7$ are energized at the same time, magnet $M_7$ being excited through contact $m_8$, magnet $M_6$ through contact $m_7$, and so on. As the magnets are energized one after another, shaft $A_2$ is displaced over one step by each of the magnets, so that it makes eight steps in total. After release of the depressed key, the magnets are de-energized in the same order. Thus, it will be understood that shaft $A_2$ is displaced over a number of steps corresponding with the number of the brush $B_2$ to which a voltage has been supplied.

In the modification shown in Fig. 8, there are also provided twelve magnets $M_1$—$M_{12}$, each connected to one of the brushes $B_2$ and to the negative terminal of the current source. For the sake of simplicity, only two of these magnets have been represented in the drawing. The said magnets drive shaft $A_2$ by means of a combination of pawls $p_1$ and $p_2$, ratchet wheels $pr_1$ and $pr_2$ and toothed wheels $tr_1$ and $tr_2$. Each of the step magnets $M_1$—$M_{12}$ actuates a ratchet wheel $pr_1$, which is freely rotatable around a fixed shaft $A_3$, by means of a pawl $p_1$. A toothed wheel $tr_1$, engaging a toothed wheel $tr_2$ which is freely rotatable around shaft $A_2$, is coupled with each of the ratchet wheels $pr_1$. The toothed wheels $tr_2$ are each provided with a resilient pawl $p_2$, engaging a ratchet wheel $pr_2$, which is fixedly mounted on shaft $A_2$. If one of the step magnets $M_1$—$M_{12}$ is energized (or de-energized, as the case may be), the pawl $p_1$ displaces the appertaining ratchet wheel $pr_1$, and this displacement is transferred by means of toothed wheels $tr_1$ and $tr_2$ and of the pawl $p_2$ to the shaft $A_2$. When the shaft $A_2$ is rotated in this manner by one of the step magnets, the ratchet wheels $pr_2$ pertaining to the other step magnets move freely over the pawls $p_2$. Now, the angular displacement of ratchet wheel $pr_1$ for each step, the transmission ratio of the toothed wheels $tr_1$ and $tr_2$, and the angular displacement of ratchet wheel $pr_2$ for each step have been made different for each step magnet, in such manner that shaft $A_2$ is displaced over 1/13 of its circumference upon excitation of magnet $M_1$, over 2/13 upon excitation of magnet $M_2$, over 3/13 upon excitation of magnet $M_3$, and so on. Hence, the angular displacement of shaft $A_2$ is again proportional to the order of the brush $B_2$ to which a voltage has been applied.

Of course, the means for driving shaft $A_2$ shown in Figs. 4–8 may also be applied to the device shown in Fig. 1, and the driving means shown in Figs. 1–3 may also be used in the device according to Fig. 4.

If desired, the commutator $C_1$ as shown in Figs. 1–8 may be replaced by a fixed contact bank, along which the brushes $B_1$ are shifted after each depression of a key of the left key group. This arrangement is especially suitable to be used in the eleven-partite device shown in Figs. 1–3. In this case, a 22-partite contact bank is used, containing contacts having the numbers 1, 10, 2, 9, 3, 8, 4, 7, 5, 6, 6, 5, 7, 4, 8, 3, 9, 2, 10, and 1, successively. These numbers indicate the magnet of the series $M_1$—$M_{10}$ connected with the contact in question. Of course the slip rings $SR_1$ and the brushes $B_2$ are superfluous in these connections. The distance at which the brushes $B_1$ are spaced with respect to each other is equal to twice the distance at which the contacts of the contact bank are spaced. The brushes $B_1$ are carried by a member which is displaced in alternate directions after each depression of a key of the left key group over a distance equal to the distance at which the contacts of the contact bank are spaced. For this purpose, magnet $M_a$ is arranged in such manner as to displace the said member when it is de-energized, alternately to the left and to the right. The said member will have to control the current distributor SV at the same time.

Devices of the kind described with reference to Figs. 1–8 may be used to advantage for facilitating the correction of printing proofs. For this purpose, such a device is incorporated in the typewriter used for writing the copy as well as in the composing machine used for composing the copy. For each sentence written on the typewriter, a check symbol is determined and printed on a separate paper ribbon. The same thing happens when the copy is composed by means of the composing machine. By comparing both paper ribbons, the sentences in which printing errors appear may be immediately detected. The printing of the check symbol may be brought about in a simple manner by the selection of a full stop. Of course, the check symbol will also be printed in this case when a full stop is written after an abbreviation, for instance, but this does not lead to any serious disadvantage. In view of the large number of symbols used in this case, it would of course be impractical to provide a separate key group for the check symbols. Therefore, the arrangement is preferably such that the indicator is returned to its zero position by the selection of a full stop. It is pointed out that the checking of each separate sentence is desirable since parts of a certain article are often composed by different composers; however, in this case the division of the article is always made at the end of a line, which may of course be done at different places in the written and the printed text. Hence, the dash (—) may not be included in the checking. If it appears that a check of each separate sentence does not facilitate the correction to a sufficient extent as printing errors occur in practically all sentences, smaller symbol groups may be checked, for instance by causing the check symbol to be printed after each selection of 100 symbols. In this case, the check symbol must also be printed at the end of each sentence, i. e. upon selection of a full stop.

A device of the kind described with reference to Figs. 1–8 may also be used for checking the correct transmission of teleprinter messages. For this purpose, a check symbol is determined and transmitted at the sending end for each sentence or for each group of a certain number of symbols, for instance of 100 symbols, and the check symbol in question is again determined and compared with the transmitted check symbol during the reproduction of the message at the receiving end. If desired, it is also possible to determine and to transmit a check symbol for each word.

If desired, the measurement of the total current may be performed with the aid of a vacuum tube circuit.

In the appended claims, the term "symbol group" designates a group consisting of any desired number of symbols selected from a given series of $n$ symbols, and the symbols in said given series are assumed to be numbered in a predetermined order. The term "check symbol of a symbol group" designates a symbol giving a univocal indication of the remainder $R_N(G)$ obtained on division of a number G by a whole number N, G being equal to the algebraic sum of the numbers of the symbols of the symbols of the group each multiplied by a whole factor $k_i$ dependent on the position of the symbol in the group and different for adjacent positions, and the said number N being equal to or greater than $n$ and having no divisors in common with any of the factors $k_i$, nor with any of the differences between the factors $k_i$ for adjacent positions.

We claim:

1. A device for determining a check symbol for a symbol group, comprising a singular selector by means of which the symbols of a symbol group may be selected one after another and from left to right, a plurality of electric contacts associated with said selector in such manner that a contact pertaining to the selected symbol is closed upon actuation of said selector, an indicator to be brought into a position corresponding with the pertinent check symbol by the selection of a symbol group, a plurality of electric control members for said indicator, each adapted to cause a displacement of said indicator over a different number of steps, means connecting the said contacts with the said control members, and a switching device changing the connections between the said contacts and the said control members after each actuation of said selector in such manner that the number of steps over which said indicator is displaced upon actuation of said selector is equal to the remainder obtained on division by a fixed number (N) of the product of a value ($a_i$) ascribed to the selected symbol and a factor dependent on the position of the selected symbol in the symbol group, the number (N) being a prime number higher than ten and the said factors for successive positions being equal to the remainders obtained on division by the key number (N) of the terms of a geometrical progression.

2. A device for determining a check symbol for a symbol group, comprising a singular selector by means of which the symbols of a symbol group may be selected one after another and from left to right, a plurality of electric contacts associated with said selector in such manner that a contact pertaining to the selected symbol is closed upon actuation of said selector, an indicator to be brought into a position corresponding with the pertinent check symbol by the selection of a symbol group, a plurality of electric control members for said indicator each adapted to cause a displacement of said indicator over a different number of steps, means connecting the said contacts with the said control members, a switching device changing the connections between the said contacts and the said control members after each actuation of said selector in such manner that the number of steps over which said indicator is displaced upon actuation of said selector is equal to the remainder obtained on division by a fixed number (N) of the product of a value ($a_i$) ascribed to the selected symbol and a factor dependent on the position of the selected symbol in the symbol group, the said factors for successive positions being equal to the remainders obtained on division by said fixed number (N) of the terms of a geometrical progression, a plurality of indicator scales associated with said indicator and each displaying the check symbols in a different order, in such manner that the distances in terms of scale divisions between any two given check symbols on successive scales are equal to the remainders obtained on division by said fixed number (N) of the terms of a second geometrical progression having the same ratio between successive terms as the said first-mentioned geometrical progression, and means actuated by said switching device for alternately making the said indicator scales operative.

3. A device as claimed in claim 2, wherein the selector is formed as a keyboard having a plurality of keys, further comprising a step magnet, means for energizing said step magnet upon depression of any key of said keyboard, and means actuated by said step magnet for displacing said switching device over one position when a depressed key is released.

4. A device as claimed in claim 2, wherein the said switching device is formed as a cummutator having a plurality of segments, further comprising a shaft for said commutator, a plurality of slip rings on said shaft, electric connections between the said segments and the said slip rings, a plurality of brushes contacting the surface of said commutator and each connected with one of the said contacts, and a second plurality of brushes each contacting one of the said slip rings and each connected with one of the said control members.

5. A device as claimed in claim 4, further comprising a plurality of glow lamps each adapted to light one of the said indicator scales, and a current distributor on said shaft for alternately switching in the said glow lamps.

6. A device as claimed in claim 4, wherein the selector is formed as a keyboard having a plurality of keys, further comprising a step magnet, means for energizing said step magnet upon depression of any key of said keyboard, and means actuated by said step magnet for displacing said shaft over one position when a depressed key is released.

7. A device for determining a check symbol for a symbol group, comprising a singular selector by means of which the symbols of a symbol group may be selected one after another and from left to right, a plurality of electric contacts associated with said selector in such manner that a contact pertaining to the selected symbol is closed upon actuation of said selector, an indicator to be brought into a position corresponding with the pertinent check symbol by the selection of a symbol group, a plurality of step magnets, a plurality of toothed racks each adapted to be displaced by one of the said step magnets and each having a different number of teeth, gearing means operative in only one direction for coupling the said toothed racks with said indicator, means connecting the said contacts with the said step magnets, and a switching device changing the connections between the said contacts and the said step magnets after each actuation of said selector in such manner that the number of steps over which said indicator is displaced upon actuation of said selector is equal to the remainder obtained on division by a fixed number (N) of the product of a value ($a_i$) ascribed to the selected symbol and a factor dependent on the position of the selected symbol in the symbol group, the said factors for successive positions being equal to the remainders obtained on division by said fixed number (N) of the terms of a geometrical progression.

8. A device for determining a check symbol for a symbol group, comprising a singular selector by means of which the symbols of a symbol group may be selected one after another and from left to right, a plurality of electric contacts associated with said selector in such manner that a contact pertaining to the selected symbol is closed upon actuation of said selector, an indicator to be brought into a position corresponding with the pertinent check symbol by the selection of a symbol group, a plurality of step magnets each adapted to displace said indicator over one step upon being energized, each of the said step magnets except the first one being provided with a make contact through which the preceding step magnet is energized, means connecting the said first-mentioned contacts with the said step magnets, and a switching device changing the connections between the said first-mentioned contacts and the said step magnets after each actuation of said selector in such manner that the number of steps over which said indicator is displaced upon actuation of said selector is equal to the remainder obtained on division by a fixed number (N) of the product of a value ($a_1$) ascribed to the selected symbol and a factor dependent on the position of the selected symbol in the symbol group, the said factors for succesive positions being equal to the remainders obtained on division by said fixed number (N) of the terms of a geometrical progression.

9. A device for determining a check symbol for a symbol group, comprising a singular selector by means of which the symbols of a symbol group may be selected one after another and from left to right, a plurality of electric contacts associated with said selector in such manner that a contact pertaining to the selected symbol is closed upon actuation of said selector, an indicator to be brought into a position corresponding with the pertinent check symbol by the selection of a symbol group, a plurality of electric control members for displacing said indicator over a different number of steps, means connecting the said contacts with the said control members, a switching device changing the connections between the said contacts and the said control members after each actuation of said selector in such manner that the number of steps over which said indicator is displaced upon actuation of said selector is equal to the remainder obtained on division by a fixed number (N) of the product of a value ($a_1$) ascribed to the selected symbol and a factor dependent on the position of the selected symbol in the symbol group, the said factors being equal to the remainders obtained on division by said fixed number (N) of the terms of a geometrical progression, a separate checking selector for selecting the check symbol accompanying a selected symbol group, and a second plurality of electric contacts associated with said checking selector in such manner that a contact pertaining to the selected check symbol is closed upon actuation of said checking selector, each contact of the said second plurality being connected in parallel with one of the contacts of said first-mentioned plurality in such manner that said indicator is returned to its zero position upon selection of the check symbol pertaining to the selected symbol group.

10. A device as claimed in claim 9, further comprising an alarm circuit, means for switching in said alarm circuit upon actuation of said checking selector, and a switch coupled with said indicator for breaking said alarm circuit in the zero position of said indicator.

References Cited in the file of this patent

UNITED STATES PATENTS

| | | |
|---|---|---|
| 1,528,567 | Poole | Mar. 3, 1925 |
| 2,241,591 | Gates | May 13, 1941 |
| 2,543,899 | Dickinson | Mar. 6, 1951 |